UNITED STATES PATENT OFFICE.

WALTER S. HICKS, OF ANN ARBOR, MICHIGAN, ASSIGNOR TO THE EUREKA MANUFACTURING COMPANY, OF BALTIMORE, MARYLAND.

TONIC BEVERAGE.

SPECIFICATION forming part of Letters Patent No. 436,477, dated September 16, 1890.

Application filed October 16, 1888. Serial No. 288,248. (No specimens.)

*To all whom it may concern:*

Be it known that I, WALTER S. HICKS, a citizen of the United States, residing at Ann Arbor, in the county of Washtenaw and State of Michigan, have invented certain new and useful Improvements in Tonic Beverages; and I do hereby declare the following to be a full, clear, and exact description of the invention, such as will enable others skilled in the art to which it appertains to make and use the same.

My invention relates to stimulating and strengthening tonic beverages, and fundamentally consists of a fermented liquor holding beef in solution. Any fermented liquor may be employed and any form of beef may be used therewith which can be dissolved in the liquor; but I prefer to employ ale and to incorporate therewith beef in the form known to the trade as "Rose's peptonized beef." The proportions are as follows: Ale, twenty-nine gallons; peptonized beef, one to two pounds. The beef is placed in the ale and the two raised to a temperature of about 150° Fahrenheit, the liquor preferably being agitated while exposed to the heat. The liquor is retained at this heat a short time and is then allowed to cool and the liquor drawn off into casks or bottles. The beef, being peptonized, is immediately assimilated on being taken into the stomach, and a pleasant beverage which contains a very considerable amount of nutritive matter is provided. I may choose to add to the amount of ale and beef above given cascara sagrada, of leaves from half a pound to one pound, or of the fluid-extract of the same one-fifth less. This affects the system in a well-known way and assists the action of the tonic properties of the liquor in relieving from constipation and strengthening and toning the stomach.

What I claim, and desire to secure by Letters Patent, is—

1. The herein-described medical and tonic beverage, consisting of ale holding beef in solution.

2. The herein-described medical and tonic beverage, consisting of ale and peptonized beef.

3. The herein-described medical and tonic beverage, consisting of ale, peptonized beef, and cascara sagrada, in the proportions set forth.

In testimony whereof I affix my signature in presence of two witnesses.

WALTER S. HICKS.

Witnesses:
L. B. WHITAKER,
J. H. WHITAKER.